US008642134B2

(12) United States Patent
Nagai

(10) Patent No.: US 8,642,134 B2
(45) Date of Patent: Feb. 4, 2014

(54) COATED-PRODUCT WITH MARKING, PROCESS FOR MANUFACTURING THE SAME, AND ENCLOSURE FOR ELECTRONIC APPARATUS

(75) Inventor: Masanori Nagai, Aichi (JP)

(73) Assignee: Sony Corporation, Tokyo (JP)

( * ) Notice: Subject to any disclaimer, the term of this patent is extended or adjusted under 35 U.S.C. 154(b) by 1453 days.

(21) Appl. No.: 12/004,226

(22) Filed: Dec. 20, 2007

(65) Prior Publication Data

US 2008/0152859 A1 Jun. 26, 2008

(30) Foreign Application Priority Data

Dec. 22, 2006 (JP) ................................ P2006-346244

(51) Int. Cl.
*B32B 3/00* (2006.01)

(52) U.S. Cl.
USPC ........... 427/510; 427/264; 427/265; 427/270; 427/271; 427/508; 427/555

(58) Field of Classification Search
USPC ........................................................ 428/195.1
See application file for complete search history.

(56) References Cited

U.S. PATENT DOCUMENTS

| | | | | | |
|---|---|---|---|---|---|
| 5,061,341 | A * | 10/1991 | Kildal et al. | ..................... | 216/65 |
| 5,413,629 | A * | 5/1995 | Yasui et al. | ................. | 106/31.15 |
| 6,207,344 | B1 * | 3/2001 | Ramlow et al. | ............ | 430/270.1 |
| 2002/0122931 | A1 * | 9/2002 | Brownfield et al. | .......... | 428/324 |
| 2005/0231585 | A1 * | 10/2005 | Mudigonda et al. | .......... | 347/238 |
| 2005/0269304 | A1 * | 12/2005 | Khan et al. | ............... | 219/121.85 |

FOREIGN PATENT DOCUMENTS

| | | |
|---|---|---|
| JP | 60 204392 | 10/1985 |
| JP | 4 307288 | 10/1992 |
| JP | 6 21124 | 3/1994 |
| JP | 8 132258 | 5/1996 |
| JP | 2000 332258 | 11/2000 |
| JP | 2002 370457 | 12/2002 |
| JP | 2003 248368 | 9/2003 |
| JP | 2005 186153 | 7/2005 |
| JP | 2007 320095 | 12/2007 |

* cited by examiner

*Primary Examiner* — Mark Ruthkosky
*Assistant Examiner* — Christopher Polley
(74) *Attorney, Agent, or Firm* — Frommer Lawrence & Haug LLP; William S. Frommer; Ellen Marcie Emas

(57) ABSTRACT

Disclosed is a coated-product with marking. The coated-product is obtained by the steps of forming a coating layer having brightness higher than the brightness of a bare surface of a molding on the surface of the molding made of resin colored with dye, and removing a predetermined portion of the coating layer by laser marking and exposing the bare surface of the coated-product to form a marking portion.

1 Claim, 4 Drawing Sheets

COATED-PRODUCT WITH MARKING, PROCESS FOR MANUFACTURING THE SAME, AND ENCLOSURE FOR ELECTRONIC APPARATUS

CROSS-REFERENCES TO RELATED APPLICATIONS

The present invention contains subject matter related to Japanese Patent Application JP 2006-346244, filed in the Japanese Patent Office on Dec. 22, 2006, the entire contents of which are incorporated herein by reference.

BACKGROUND OF THE INVENTION

1. Field of the Invention

The present invention relates to a coated-product with marking such as characters, numbers, figures, or patterns, a process for manufacturing the coated-product with marking; and an enclosure for an electronic apparatus utilizing the coated-product with marking.

2. Description of the Related Art

Examples of the laser marking techniques are disclosed as follows. Japanese Unexamined Patent Application Publication No. H8-132258, for example, discloses a method of forming laser-marking by irradiating a marking portion such as characters, symbols, and figures, with a laser beam, and a marking sheet utilized therefor. The method disclosed in this publication includes "irradiating to remove a prescribed portion of a colored layer in a marking sheet that includes at least a pressure-sensitive adhesive layer, a coated-sheet layer removably provided on one surface of the pressure-sensitive adhesive layer, and a laser-absorbent colored-layer provided on the other side of the pressure-sensitive adhesive layer".

In this method, the marking portion can appear due to the contrast between the colored layer and the color of the product. Thus, the method includes a simple step of irradiating the marking sheet with a laser beam to form the marking portion without having to utilize two types of layers mutually having different colors, because the color of the outer surface of the product per se can be used for clearly displaying the marking portion ([0016] in the description).

Japanese Unexamined Patent Application Publication No. 2000-334584, for example, discloses a method of marking an appropriate position of a metallic component attached to various apparatus with various labels such as manufacturer name, model, and product number, by irradiating a marking portion such as characters, symbols, and figures, with a laser beam; and a metallic component utilized such a method. In this method, "coating is applied to unfinished surface of a component made of a metallic material, and the coated surface is irradiated with a laser beam to form predetermined engraved patterns".

According to this method, "a desired label can simply be provided on the outer surface of the component at low cost without utilizing a nomenclature plate or original printing plate" ([0027] in the description).

Japanese Unexamined Patent Application Publication No. 2003-24868, for example, discloses a method of laser-marking by irradiating the coating of the coated-product with a laser beam to burn and remove the irradiated portion. In this method, "the coating of the coated-product is irradiated with a laser beam to burn and remove the irradiated portion, and the coating is mixed with a metallic powder as a laser beam absorbing element, which generates heat and burn the obtained coating".

In this method, the coating of the coated-product is irradiated with a laser beam to burn and remove the irradiated portion; and excellent laser-marking can be provided on the coated-product having an arbitrary color without causing degradation of the color.

In general, a laser used for laser processing is roughly divided into two types based on oscillation wavelengths thereof.

The first type of a laser has an oscillation wavelength of approximately 1064 nm, with which markable materials may vary depending on a laser medium or laser system that amplifies a laser beam. The laser of this type having an oscillation wavelength of 1064 nm may be used for providing excellent laser processing on resin or metal parts; however, may not be used for processing transparent materials. Typical examples of this type include an Yttrium-Aluminum Garnet ($Y_3Al_5O_{12}$:YAG) laser, $YVO_4$ laser, and FAYb laser. A YAG laser can be used for engraving metal parts, some types of which have a short wavelength. A $YVO_4$ laser is capable of printing marks on metal parts, and is suitable for fine laser marking. An FAYb laser has an excellent excitation efficiency.

The second type of a laser has an oscillation wavelength of approximately 10600 nm, with which letters or characters can be printed on papers or transparent materials.

A typical example of the second type includes a $CO_2$ laser. The $CO_2$ laser may be used for processing resin or transparent materials; however, may not be used for processing metal materials.

Materials to be laser-processed differ depending on the wavelength that a laser has, as described below. Metal materials can be processed with the laser having the oscillation wavelength of 1064 nm, because the laser beam of this type is absorbed by metal. By contrast, the metal materials may not be processed with the laser having the oscillation wavelength of 10600 nm, because the laser beam of this type is reflected by metal. However, transparent materials may not be processed with the laser having the oscillation wavelength of 1064 nm, because the laser beam of this type is easy to transmit the transparent materials. By contrast, the transparent materials can be processed with the laser having the oscillation wavelength of 10600 nm, because the laser beam of this type is absorbed by the transparent materials.

A typical example of the materials for a molding that is laser marked by the second type laser includes resin. There are natural resin and synthetic resin, each divided into thermoplastic and thermosetting types. Although resin differs in characters depending on the quality of the material; however, the resin is generally easy to process, and is comparatively light in weight but still has certain hardness. Such resin is generally transparent and colorless, so the resin is usually colored with colorant in practical use.

A typical example of the colorant for resin includes pigment. Pigment is an insoluble, either colored or colorless substance; fine particles of which are dispersed into an appropriate vehicle, and used for coloring by kneading the obtained vehicle into plastic or rubber. The pigment type colorant contains carbon (C) which can easily blacken a material without fail. The carbon-containing pigment is thus used as colorant for a material to be blackened. However, the resin per se that is mixed with the carbon-containing pigment tends to be calescent due to the carbon therein. Consequently, when the carbon-containing resin is laser-marked, the carbon in the area irradiated with laser beams may be burned.

FIG. 1 is a cross-sectional view illustrating a state where a carbon-containing coated film is burned by laser irradiation. FIG. 2 is a photographed image of a marking portion of a molding in the state illustrated in FIG. 1. In FIG. 1, a numeral 100 indicates the molding, to the surface of which a coating layer 101 is applied. An irradiated portion 102 with laser beams of the coating layer 101 has a rough surface due to burned carbon, and thus the outcome of the printed product exhibits inferior printing quality. If carbon in the large portion of the material is burned, the material color per se may change, and hence the designated color may not accurately appear in the printed product.

In response to the above-described outcome, an attempt has been made to add dye into resin as the colorant in place of pigment. The resulting resin material can be provided with laser-marking having the designated printing color without changing the original color of the material. The difference between dye and pigment is as follow; while pigment used in laser-marking contains carbon that is burned to result in changing the material in color, no carbon is contained in dye so that the color of the material remains unchanged without being burned.

SUMMARY OF THE INVENTION

As described above, the laser-marking technology in which the carbon-containing pigment is used as colorant for resin or for coating agent, the irradiated portion with laser beams of the coating layer has a rough surface due to burned carbon, and thus the outcome of the printed product has exhibited inferior printing quality.

A coated-product with marking according to an embodiment of the invention is obtained by a process including the steps of forming a coating layer having brightness higher than the brightness of a bare surface of a molding on the surface of the molding made of resin colored with dye, and removing a predetermined portion of the coating layer by laser marking and exposing the bare surface of the coated-product to form a marking portion.

A process for manufacturing a coated-product with marking according to an embodiment of the invention includes a coating step forming a coating layer having brightness higher than the brightness of a bare surface of a molding on the surface of the molding made of resin colored with dye, a laser removing step removing a predetermined portion of the coating layer by laser marking and exposing the bare surface of the coated-product to form a marking portion.

An enclosure for an electronic apparatus according to another embodiment of the invention is obtained by a process including forming a coating layer having brightness higher than brightness of a bare surface of a molding on the surface of the molding made of resin colored with dye, and removing a predetermined portion of the coating layer and exposing the bare surface of the coated-product to form a marking portion.

According to a coated-product with marking, a process for manufacturing the same, and an enclosure for an electronic apparatus according to embodiments of the invention, since dye is employed as colorant for the resin that forms a molding, the marking portion of the resin material can be provided with the designated printing color without changing the original color of the material, thus laser-marking portion can clearly appear with the designated printing color.

DESCRIPTION OF THE PREFERRED EMBODIMENTS

Figure 3:
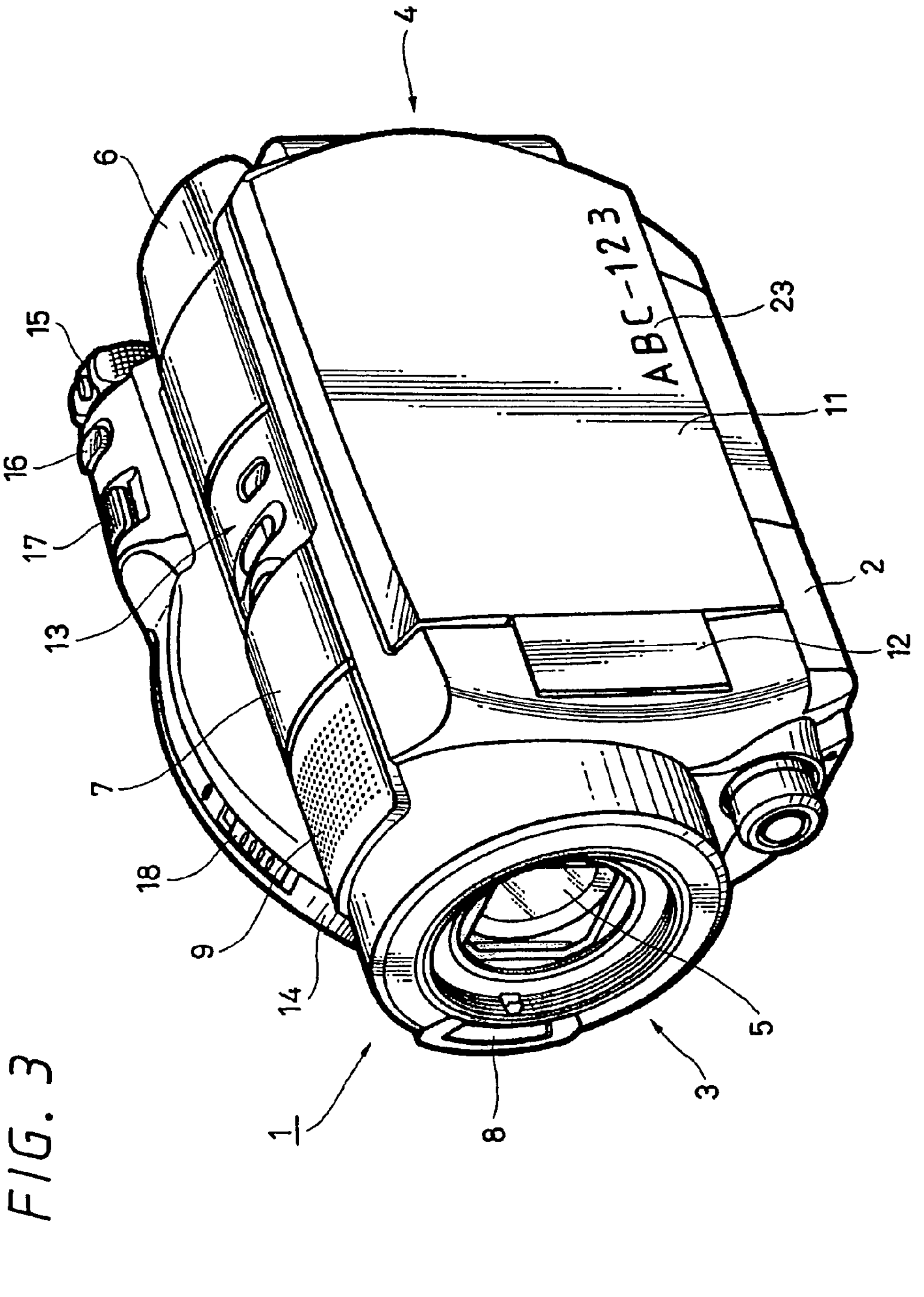
FIG. 3 is a perspective view illustrating a digital camcorder viewed from the front side thereof, which indicates a first embodiment of an electronic apparatus having the coated-product with marking of the invention.
Figure 4:
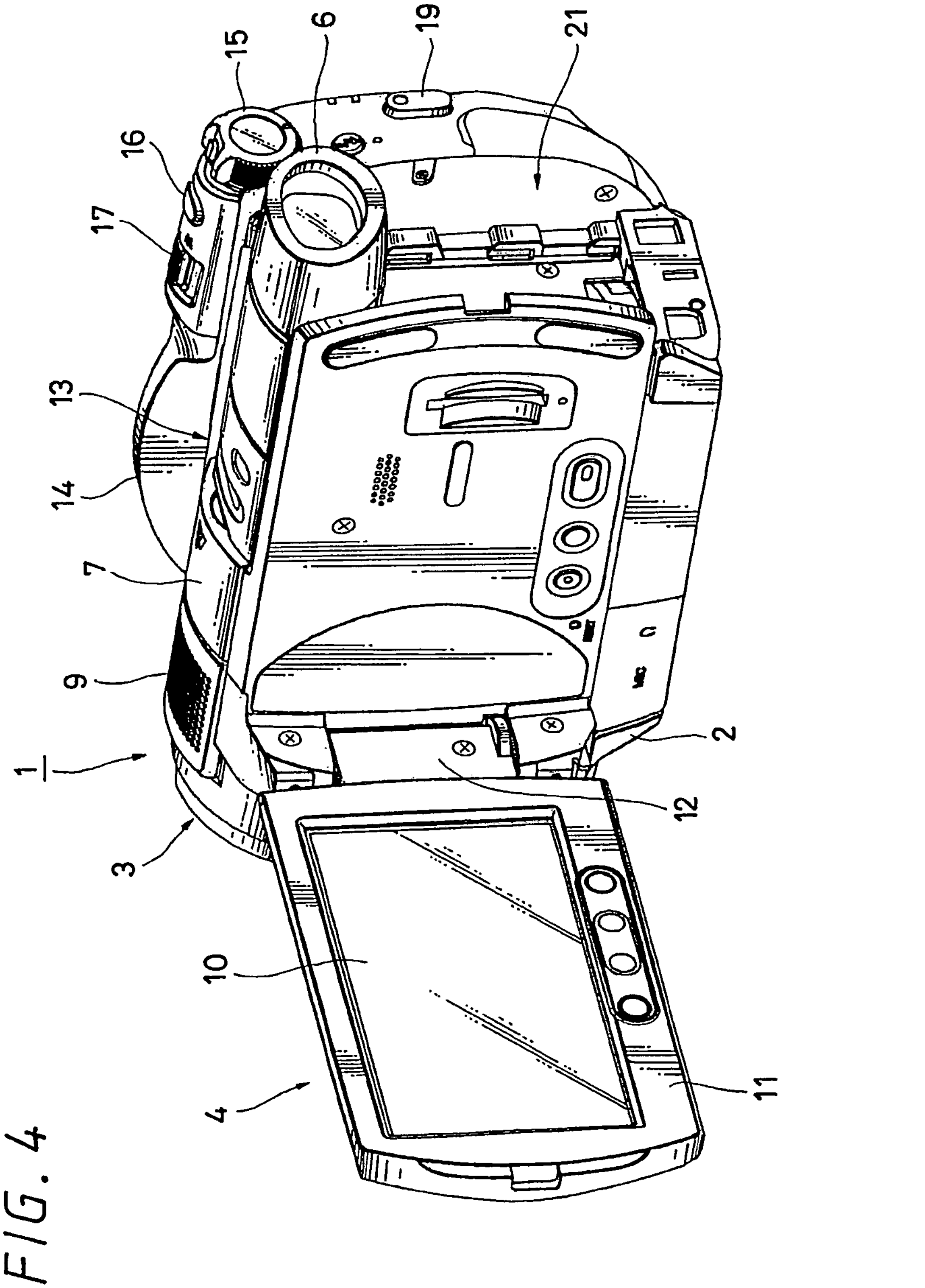
FIG. 4 is a perspective view illustrating the digital camcorder viewed from the rear side with a display device thereof being open, indicating the first embodiment of the electronic apparatus having the coated-product with marking of the invention.
Figure 5:
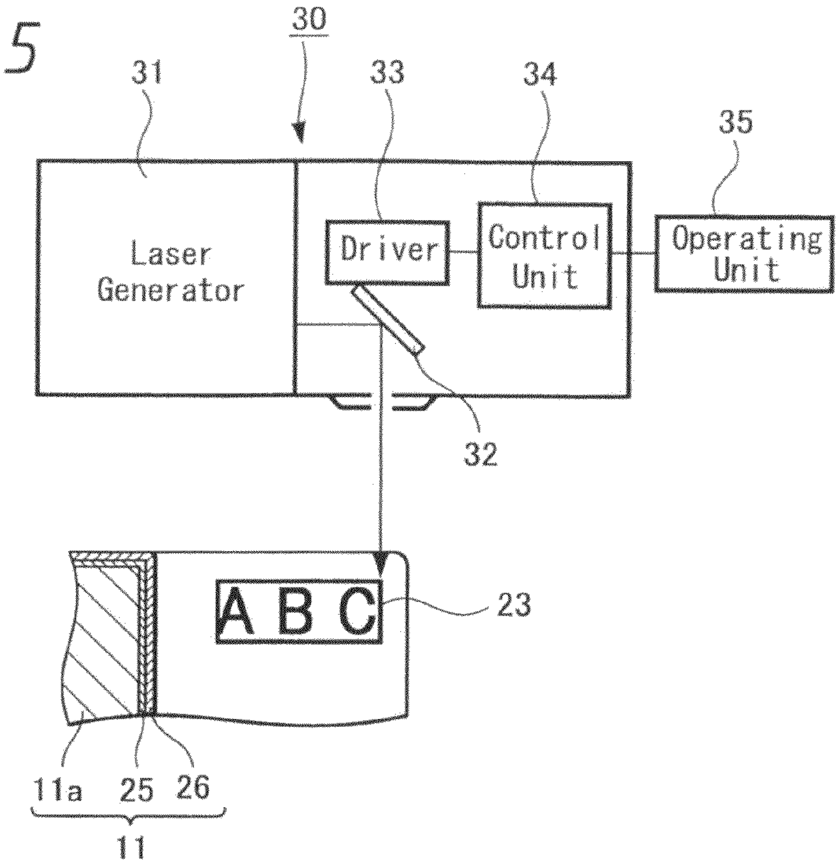
FIG. 5 is a schematic configuration diagram illustrating a laser marker of a first embodiment of the invention that is used in manufacturing the coated-product with marking.
Figure 6:
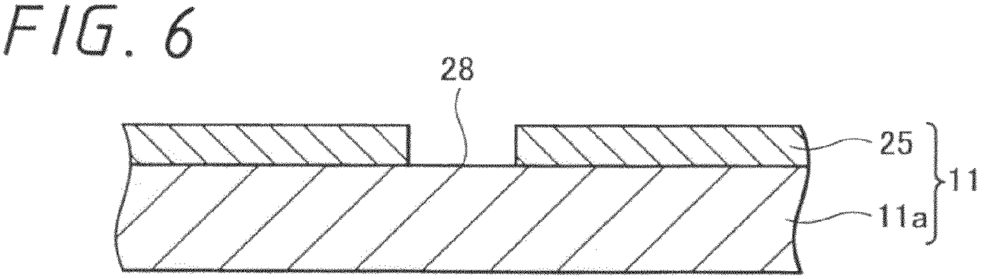
FIG. 6 is a view illustrating a production process for a coated-product that is marked according to the invention.
Figure 7:
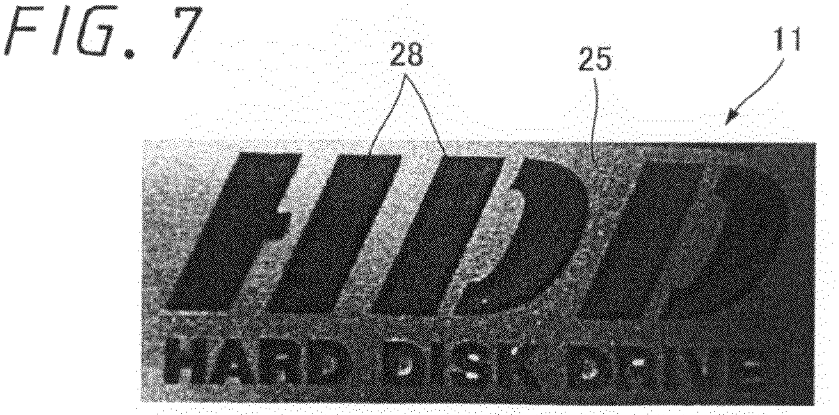
FIG. 7 is a photograph showing a marking portion of the coated-product illustrating the production process therefor according to the invention.

According to a simple configuration of an embodiment of the invention, there are provided a coated-product with marking capable of being displayed with a designated color, a method for manufacturing the coated-product with marking, and a enclosure for an electronic apparatus utilizing the coated-product with marking FIGS. 3 to 7 are views each illustrating an embodiment of the invention. Specifically, FIGS. 3 and 4 are external perspective views of a camcorder according to an electronic apparatus of a first embodiment of the invention having the coated-product with marking. FIG. 5 is a schematic configuration diagram illustrating a laser marker, and FIGS. 6 and 7 are views each illustrating marking process by which the coated-product of the first embodiment of the invention is marked.

EXAMPLE 1

Specifically, an imaging apparatus according to an electronic apparatus of a first embodiment of the invention having the coated-product with marking will be described with reference to FIGS. 3 and 4. The apparatuses shown in FIGS. 3 to 4 are each representing a digital camcorder 1 according to an embodiment of an imaging apparatus. The digital camcorder 1 employs an optical disk specified as an example of an information storage medium. In the digital camcorder 1, an optical image is converted into a electric signal using an imaging element specified as an example of imaging mechanism, such as charge-coupled device (CCD) or CMOS image sensor, so as to record the image information on the optical disk or display the information on a display device formed of a planer panel such as a liquid crystal display (LCD).

However, an information storage medium used in the imaging apparatus that is specified as an example of an electronic apparatus of the invention is not limited to an optical disk such as DVD-R, DVD-RW, or DVD-RAM. Disk recording media such as MO, FD, other recordable magneto-optical disk, or magnetic disk can also be used as the information storage medium. Examples of the electronic apparatus utilizing the recording media include a magneto-optical disk still camera when utilizing a magneto-optical disk, and a magneto-optical disk electronic organizer when utilizing a magneto-optical disk.

An information storage medium utilized for an embodiment of the invention is not limited to the above-described disk type storage media; however, various storage media can be used, such as a tape type storage medium having a magnetic tape therein, a semiconductor storage medium having a semiconductor memory therein, and a card type storage medium having a memory card therein.

FIGS. 3 and 4 show a digital camcorder 1 that includes an exterior case 2 illustrating a specific example of an enclosure exhibiting an external appearance, a disk driver housed in the exterior case 2 and rotatably driving an optical disk detachably attached thereto for recording (writing) and retrieving (reading) information signals, a control unit controlling to drive the disk driver, a lens device 3 capturing a subject image as light and transmitting the light to an imaging element, and a display device 4 rotatably attached to the exterior case 2.

The exterior case 2 includes a hollow enclosure having an approximately rectangular parallelepiped, a driver panel and a display panel mutually faced in the width direction thereof exterior case 2, a front panel closing a first opening of a cylinder including the both panels, and a rear panel closing a second opening of the cylinder. The digital camcorder is used such that the longitudinal direction of the exterior case 2 is placed in a longitudinal direction and the bottom of the exterior 2 is directed downwards. A lens device 3 is provided in the upper portion of the exterior case 2 such that an objective lens or imaging lens of a lens system is exposed in the front of the lens device 3.

The lens device 3 is provided in the exterior case 2 such that an optical axis of the lens system is directed in a horizontal direction. The imaging element is provided at a rear portion of the lens device 3 in the exterior case 2, though not shown in the figure. A viewfinder 6 projecting the subject image input from the lens device 3 is provided in the rear portion the lens device 3. Further, there is provided in the upper portion of the exterior 2 an opening exposing an accessory shoe to which accessories such as a video light or an external microphone are detachably attached. The accessory shoe is provided immediately in front of the viewfinder 6, and is usually detachably covered with a shoe cap 7 opening and closing the opening of the accessory shoe. Further, the luminous portion 8 of a flash unit is arranged in the front of the exterior case 2, and a stereo system microphone 9 is installed therein.

A display device 4 is position-changeably attached to one side of the exterior case 2. The display device 4 includes a plane panel 10 having a plate-shaped liquid crystal display, a panel case 11 containing the plane panel 10, and a panel support 12 capable of position-changeably supporting the panel case 11 to the exterior case 2. The panel support 12 includes a horizontal rotating portion capable of rotating the panel case 11 approximately 90 degrees around a vertical axis as rotational center in a horizontal direction, and a longitudinal rotating portion capable of rotating the panel case 11 approximately 180 degrees around a horizontal axis as a rotational center in a longitudinal direction.

The display device 4 can optionally be orientated in any of the following attitudes: an attitude where the display device 4 is housed in the side of the exterior case 2 as shown in FIG. 3; an attitude where the panel case 11 of the display device 4 is rotated 90 degrees in a horizontal direction so that the plane panel 10 is directed backward as shown in FIG. 4; an attitude where the backward directed panel case 11 is rotated 180 degrees so that the plane panel 10 is directed forward; and an attitude of an intermediate position between the above three. An operating unit 13 having a plurality of operating buttons is provided on top of the exterior case 2 located above the display device 4.

Further, a disk cover capable of closing and opening to cover or expose a disk attaching portion, to which an optical disk is removably attached, is removably provided on the opposite side of the exterior case 2 of the display device 4.

The disk drive device rotationally drives the optical disk attached to a turntable at a predetermined rate (e.g., constant linear velocity), displaces an optical pickup in a radial direction of the optical disk, and records (writes) and reproduce (reads) an information signal on an information recording surface of the optical disk. The disk cover 14 covering the disk drive device includes a power switch 15 combining a function of a selecting switch, a shutter button 16 imaging a static image, a zoom button 17 consecutively zooming the image in (tele) or out (wide) within a predetermined range, an opening and closing switch 18 locking and unlocking the disk cover 14, and a recording button 19 imaging a dynamic image.

The power switch 15 has a function to switch the power on or off by rotational operations and a function to switch so as to repeat a plurality of function modes by rotational operations while the power is still on. Further, though not shown in the figure, the disk cover 14 includes a strap belt to which a hand pad is attached. The strap belt and hand pad are utilized with the digital camcorder for supporting a user's hand, so that the user will not fall the digital camcorder 1.

In addition, though not shown in the figure, a battery housing 21 to which a battery device as a portable power supply is removably attached is provided on a rear face of the exterior case 2. The battery housing 21 is provided approximately in the center of the rear face of the exterior case 2, so that a rear panel forming the rear face of the exterior case 2 is provided to open backward. The recording button 19 is provided on the right side of the battery housing 21 on the rear face of the exterior case 2.

As shown in FIG. 3, a model code 23 ("ABC-123" in this example) showing a model name of the digital camcorder 1 is laser-marked on the lower part of the surface of the panel case in the display device 4. The model code 23 is formed by applying coating and UV-coating to the surface of the molding 11*a* of the panel case 11, and then laser-marked the surface with a laser marker 30.

As shown in FIGS. 5 and 6, a coating layer 25 is formed by applying coating having an appropriate color on the surface of the molding 11*a* of the panel case 11. The first layer forming step is defined as a step of forming the coating layer 25. A transparent layer 26 is additionally formed on the coating layer 25 by applying an ultraviolet (UV)-coating. The second layer forming step is defined as the step of forming the transparent layer 26. The laser marking can be carried out by removing desirable portions of the coating layer 25 and transparent layer 26 using laser beams, and forming predetermined characters, numbers, figures, or patterns. The coating layer 25 having brightness higher than that of the molding 11*a* is employed. It is preferable that a bare surface of the molding 11*a* be black or gray; however, any other colors may also be used.

A preferable example of the material used for the molding 11*a* includes plastic such as an acrylonitrile butadiene styrene resin (ABS), and polycarbonate (PC)/ABS resin. However, any other engineering plastic, or various materials such as metal, glass, and ceramics may also be used as the material for the molding. The molding 11*a* may be colored with dye. In this case, a preferable dye may be carbon-free; however, the carbon-containing dye may also be used.

Here, dye is a substance having a unique color (pigment) that selectively absorbs wavelengths of visible light, is used for dying fabric by an appropriate staining technique, and has relatively high fastness of the dye against daily encountering external conditions, such as sunlight, washing, and friction.

There are natural dyes and synthetic dyes. An organic compound may need to preferentially absorb some wavelengths of light having a visible region of 400 nm to 800 nm to exhibit colors, and the residual colors or complementary colors of the compound appear the colors of yellow, red, and green which are observed by the naked eyes. Meanwhile, the organic compound that absorbs the entire wavelength range of the visible region appears gray or black. Examples of dye include direct dye, acid dye, mordant dye, basic dye, sulfur dye, vat dye, solubilized vat dye, reactive dye, and oil color. Further, examples of various coating include oil paint, varnish, enamel paint, spirit varnishes (cerax, white-rax, quick drying varnish), synthetic resin coating (phenol resin, epoxy resin), cellulose derivatives.

Next, FIG. 5 shows a schematic diagram of a laser marker. The laser marker 30 is used for processing a material by irradiating the material with a laser beam to have the laser beam absorbed. The laser marker 30 includes a laser generator 31 generating a laser beam, a mirror 32 bending the laser beam generated from the laser generator 31 to irradiate the material (molding), a driver 33 causing the mirror to travel or rotate so as to irradiate a predetermined position of the material with the laser beam, a control unit driving and controlling an operation of the driver 33, and an operating unit 35 inputting a control signal to control the control unit 34.

Typical examples of the laser generated from the laser generator in the laser marker 30 include a laser having an oscillation wavelength of 1064 nm, such as a YAG (Yttrium-Aluminum Garnet) laser, $YVO_4$ laser, and FAYb laser. Further, the laser generator 31 has a function to generate a laser beam based on at least two types of frequencies. The first frequency of the laser beam is in a range of 5 to 20 kHz, and the most preferable frequency is approximately 10 kHz. The laser beam having such a low frequency damages a UV (ultraviolet) layer (transparent layer) for protecting a coating layer 25 applied to the surface of the molding 11*a*, though not shown in the figure.

Figure 1:
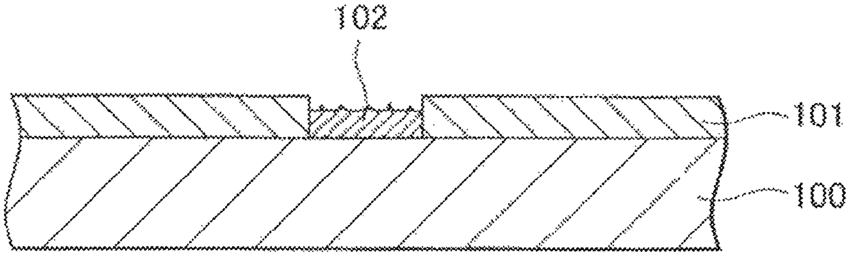
FIG. 1 Related Art
FIG. 1 is a view illustrating a process for manufacturing a coated-product that is marked according to the related art.
Figure 2:
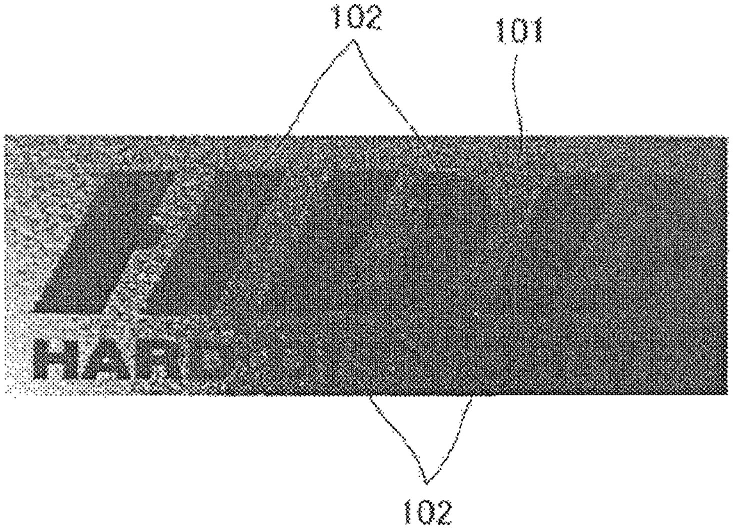
FIG. 2 Related Art
FIG. 2 is a photograph of a marking portion of the coated-product illustrating the process therefor according to the related art.

The second frequency of the laser beam is in a range of 100 to 300 kHz, and the most preferable frequency is approximately 200 kHz. Having been pre-processed with the laser beam having the low frequency; a pre-processed portion is ablated twice with the laser beam having the high frequency so that the coating layer 25 and the pre-processed portion are simultaneously removed. As a result, a marking portion 28 formed by laser marking is exposed on the surface of the panel case 11 of a molding. FIG. 7 is a photograph showing the thus obtained marking portion 28. In comparison to the photograph in FIG. 2, the obtained characters in FIG. 1 can exhibit clear definition as a whole, and thus clear characters, numbers, figures, or patterns can be obtained.

As shown in FIG. 7, if no transparent layer (UV layer) is provided on the surface of the molding 11*a*, the coating layer 25 is directly damaged using a laser having an appropriate frequency. In this case, a $CO_2$ laser that is a laser having an oscillation wavelength of 10600 nm or other types of lasers may be used. Specifically, marking on the molding is formed by, for example, a laser marker according to the following procedure.

The coating layer 25 is removed by irradiating the layer with a laser beam having an appropriate frequency generated from the laser marker 30. In this manner, only the coating of the coating layer 25 can be removed, and hence the marking portion 28 can be formed with color of the material per se as a printing color, without burning the surface of the molding 11*a*. Since the molding includes dye as colorant that contains no carbon and the molding contains no burnable component when irradiating it with the laser beam. Thus, the color of the material per se has appeared as a printing color by only removing the coating of the coating layer 25.

In a case where the second processing is conducted with a laser having a high frequency, the entire pre-processed portion may be removed. Alternatively, part of the pre-processed portion may be removed.

As described above, according to the coated-product with marking, the process for manufacturing the same, and the enclosure for an electronic apparatus of the embodiments of the invention, a molding (material) is colored with dye only, coating is applied to the molding, and the obtained molding is then laser-marked. Since the thus obtained molding contains no component that is burned by a laser application, it is possible to only remove the coating and the color of the material per se appears as a printing color. Consequently, since the molding has no rough surface obtained by a laser beam application, a clear color of the bare surface can be exposed by removing all the excess portions. Accordingly, the marking step can be simplified, and a molding having with clear marking can be produced at a relatively lower cost.

The present invention is not limited to embodiments described above and shown in the drawings and can be subjected to various modifications without departing from the scope of the invention.

For example, although the aforementioned example illustrates the digital camcorder as a specific example of an imaging apparatus that utilizes the embodiment, other imaging apparatus can also utilize the embodiment such as analog camcorders, electronic digital still cameras, and DSCs; terminal apparatus such as cellular phones, PHS, telecommunications equipment, and personal computer; and any other electronic apparatus such as electronic dictionaries, and DVD players, and car navigation systems. Specifically, the laser-marking can be applied to a compact apparatus with various types (delivering destination and models). Moreover, the above example has illustrated that a panel case of the display device is provided with the laser marking; however, any other portions can be provided with the marking such as an exterior, shoe cap, disk cover, and various operation buttons of the display device.

It should be understood by those skilled in the art that various modifications, combinations, sub-combinations and alterations may occur depending on design requirements and other factors insofar as they are within the scope of the appended claims or the equivalents thereof.

What is claimed is:

1. A process for manufacturing a coated-product with a marking comprising:

a first coating step of forming a coating layer directly on a bare surface of a molding, the coating layer having brightness higher than that of the bare surface of the molding, wherein the molding is made of resin colored with dye, a second coating step of forming a transparent layer directly on the coating layer, the transparent layer being damaged when exposed to a laser beam frequency in a range of 5 to 20 kHz, and a laser removing step of removing a predetermined portion of the transparent layer and the coating layer by laser marking to expose the bare surface of the molding to form a marking portion wherein a wavelength of the laser emission is 1064 nm.

* * * * *